United States Patent [19]
Teague et al.

[11] 3,873,673
[45] Mar. 25, 1975

[54] WET SCRUBBING OF FLUE GAS FOR SOX REMOVAL

[75] Inventors: Richard K. Teague, St. Louis, Mo.; Phillip L. Hayden, Dayton, Ohio

[73] Assignee: Monsanto Company, St. Louis, Mo.

[22] Filed: July 17, 1973

[21] Appl. No.: 380,030

Related U.S. Application Data

[63] Continuation-in-part of Ser. No. 264,644, June 20, 1972, abandoned, which is a continuation-in-part of Ser. No. 225,942, Feb. 14, 1972, abandoned, which is a continuation-in-part of Ser. No. 178,145, Sept. 7, 1971, abandoned.

[52] U.S. Cl. ............................... 423/243, 423/512
[51] Int. Cl. .......................................... C01b 17/00
[58] Field of Search .......... 423/242, 243, 244, 512, 423/555, 166

[56] References Cited
UNITED STATES PATENTS

| | | | |
|---|---|---|---|
| 1,989,004 | 1/1935 | Fife .................................... | 423/243 |
| 2,128,027 | 8/1938 | Clark .................................. | 423/243 |
| 3,542,511 | 11/1970 | Shah .................................. | 423/242 |
| 3,620,674 | 11/1971 | Renault et al. ...................... | 423/243 |

*Primary Examiner*—O. R. Vertiz
*Assistant Examiner*—Gregory A. Heller
*Attorney, Agent, or Firm*—Arthur E. Hoffman

[57] ABSTRACT

Flue gas enters a wet scrubber where it comes in contact with a circulating aqueous solution containing from 1 to 10 weight percent of an amine, such as diethanolamine, monoethanolamine, or mixtures thereof, at pH of about 4 to 8, for example about 7. As the solution removes $SO_x$ ($SO_2$ and $SO_3$) from the flue gas, the pH drops slightly, for example, to about 6.0. At this predetermined point the solution is considered "spent" and is withdrawn for regeneration. Regeneration is performed in two steps. The first step adjusts pH to about 5.5 to 11, preferably about 7 to 10 by addition of supernatant from the second regeneration step which provides calcium ions, or alternatively supplemental calcium ion can be provided by adding calcium hydroxide directly to the first step, and some calcium sulfite precipitates at this point. The second step removes the sulfur values picked up from the flue gas in the scrubber by addition of calcium hydroxide to raise the pH of solution to about 10 to 12. These "reaction products" are removed in the form of calcium sulfite and calcium sulfate. This two-step regeneration makes possible the exclusion of calcium ion from the scrubber and minimizes calcium ion at all times in all the liquid systems, thereby preventing the troublesome accumulation of scale normally associated with calcium base scrubbing.

9 Claims, 1 Drawing Figure

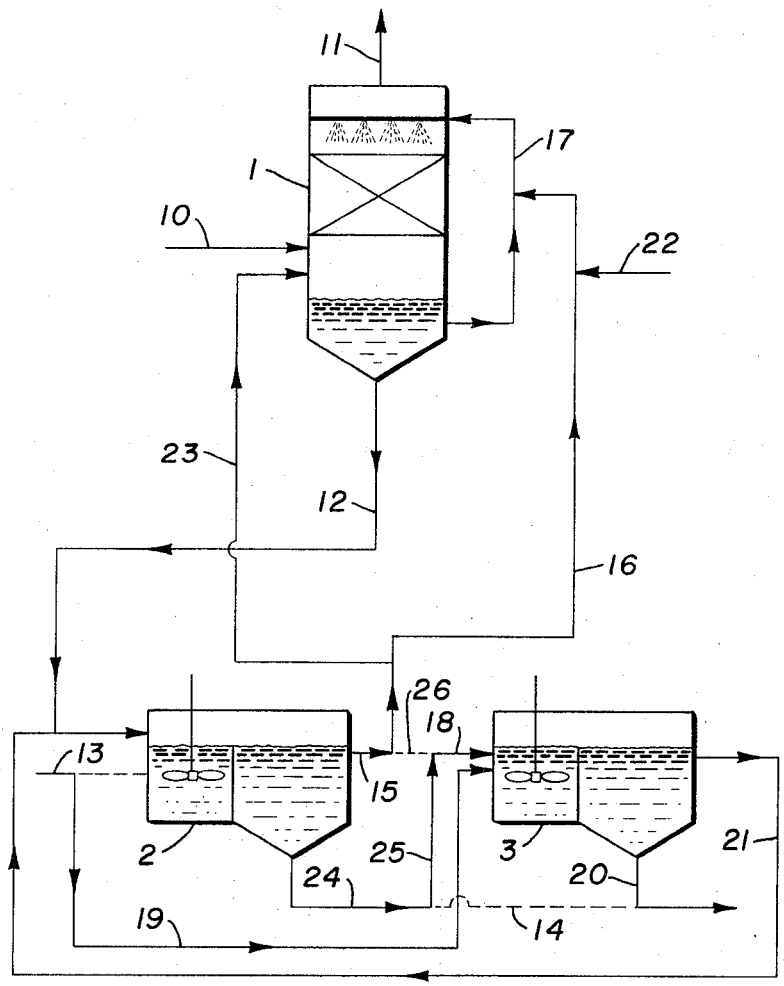

WET SCRUBBING OF FLUE GAS FOR SOX REMOVAL

CROSS-REFERENCE TO RELATED APPLICATIONS

This application is a continuation-in-part of application Ser. No. 264,644, filed June 20, 1972, now abandoned which is a continuation-in-part of application Ser. No. 225,942, filed Feb. 14, 1972, (now abandoned), which is a continuation-in-part of application Ser. No. 178,145, filed Sept. 7, 1971 (now abandoned).

BACKGROUND OF THE INVENTION

Description of the Prior Art. Alkaline wet scrubbing of flue gas is generally accepted and has an outstanding advantage over all other methods so far proposed for removal of $SO_x$; namely: it requires considerably less capital investment. Among the alkaline materials, calcium compounds are best suited to $SO_x$ scrubbing systems because they permit easy regeneration of scrubbing liquid, are readily available, and are low in cost. But there is one major overriding disadvantage to calcium base scrubbing; namely; formation of scale in the scrubber which causes intolerable operating problems and high operating costs. The process of our invention using an organic alkali, such as an ethanolamine, in the scrubbing liquid instead of a calcium compound eliminates the scaling problem in the scrubber while affording the other desirable technical advantages of calcium base scrubbing.

SUMMARY OF THE INVENTION

It is an object of this invention to provide an amine scrub process for the removal of $SO_x$ from flue gas, with calcium regeneration of the spent amine, wherein no precipitation or scaling occurs in the scrubber.

This and other objects are accomplished by the process hereinafter described, wherein flue gas is scrubbed with an aqueous solution of a defined class of amines at a pH of about 4 to 8; the spent amine solution is divided into two or more portions, one portion being recirculated to the scrubber; a second portion of the spent amine solution being subjected to a first treatment with up to stoichiometrically equivalent proportion of calcium ions based upon sulfite ions in the spent amine solution to precipitate calcium sulfite; a portion of the liquor from this first treatment being recirculated to the scrubber; a second portion or all of the remaining said liquor being subjected to a second treatment with calcium hydroxide at a pH of about 10 to 12 to precipitate sulfate ions and any remaining sulfite ions as the calcium salts thereof; and recirculating overflow supernatant from this second treatment to said first treatment.

DETAILED DESCRIPTION

A process for $SO_x$ ($SO_2$ and $SO_3$) removal from flue gas comprising the following steps:

Step a. of treating flue gas to absorb $SO_x$ contained therein with an aqueous solution containing from about 1 to 10 weight percent of an amine having a $pK_a$ of about 7 to 11, such as, for example, monoethanolamine, diethanolamine, or mixtures thereof. The aqueous phase is maintained at the beginning of absorption at a pH of about 4 to 8.

Step b. of withdrawing a portion of at least partially spent amine solution (now at a pH of from about 4 to 7.5) from step (a) and recirculating said portion back to treat flue gas in step (a). The amount of spent amine solution which is recirculated back to step (a) can preferably range from zero to 95 percent, and particularly from 50 to 90 percent, of the total at least partially spent amine solution leaving step (a), depending upon how much $SO_x$ absorbability remains in this solution.

Step c. of withdrawing all or a portion of the remaining at least partially spent amine solution from step (a) and treating this solution with the calcium ions contained in the overflow supernatant from step (e) to precipitate at least a portion of the sulfite ions in the solution as calcium sulfite. The amount of calcium ions used in this step is stoichiometrically equal to or less than the sulfite ion content of the at least partially spent amine solution being treated. All or part of such calcium ion requirement may be supplied by the overflow supernatant from step (e), any remaining requirement being supplied by calcium hydroxide added directly to this step (c). In a preferred embodiment the supernatant resulting from this step (c) will have a pH of about 5.5 to 11 and more preferably about 7 to 10.

Step d. of withdrawing a portion of liquor from step (c) and recirculating said portion back to treat flue gas in step (a). The amount of this liquor which is recirculated back to step (a) can preferably range from about 20 to 80 percent, and particularly from 40 to 60 percent, of the total liquor.

Step e. of withdrawing all or a portion of the remaining liquor from step (c) and treating this liquor which contains sulfate and any remaining sulfite ions with calcium hydroxide to precipitate calcium sulfate and calcium sulfite salts. The quantity of calcium hydroxide required is that which will provide at least a stoichiometrically equivalent proportion of calcium ions based upon the sulfate and sulfite ion content, as well as of any carbonate ion content present. This step (e) treatment is carried out at pH of about 10 to 12. If necessary, a further quantity of calcium hydroxide may be added to attain such pH. The calcium sulfite solids formed in step (c) may be contained in this portion of the liquor from step (c), for example, as a slurry or in suspension, and will not interfere with this step (e) treatment. Alternatively such calcium sulfite solids may be separated and recovered from step (c) for disposal.

Step f. of separating the solid calcium salts formed in step (e) and recirculating the overflow supernatant from step (e) back to the step (c) treatment. In a preferred embodiment, sufficient calcium hydroxide will have been added in step (e), and optionally in step (c) also, to effect the desired pH of about 5.5 to 11 in the step (c) liquor.

Unslaked lime can be used in place of calcium hydroxide since the primary objective is to have calcium ions present for precipitation and hydroxyl ions present for any necessary pH control.

In preferred embodiments, the at least partially spent amine solution leaving step (a) will have a pH of about 5.5 to 7, for example 6, and the pH of the solution entering step (a) scrubbing will have a pH of about 6 to 8, for example 7. These pH values can be maintained or adjusted by mixing the recirculated solution from step (a) and the recirculated liquor (regenerated amine solution) from step (c) in predetermined proportions, by adjusting the ratio of at least partially spent amine solution which is recirculated to that which is regenerated in step (c), by varying the pH of the recirculated liquor from step (c), and by the periodic addition of makeup water and amine to the step (a) scrubbing system. The recirculated liquor from step (c) returns the regenerated amine solution back to step (a).

The process of this invention is suited to the treatment of flue gases containing a wide range of $SO_x$ loadings, for example, from as little as about 200 parts per million (PPM) to as much as ten to fifteen volume percent. In general, the amine solution concentration chosen is directly proportional to the $SO_x$ loading of the flue gas being treated, to the flow rate of the flue gas in the scrubber, and to the volume flow rate of the amine solution through the scrubber.

There is no need in the practice of this invention for pretreatment of the flue gas to remove carbon dioxide contained therein since, although calcium ions are present in the amine solution, the pH maintained in the scrubber will prevent precipitation of any calcium salts therein, including bicarbonates or carbonates which would be formed at such pH range by any carbon dioxide present. Thus, no scaling of the scrubber will be caused. Moreover, the amine solution is sufficiently buffered that no matter how many sulfate, sulfite, and carbonate ions may be formed, the pH will not change sufficiently to cause precipitation. The amine solution will be considered to be spent when it has absorbed a predetermined quantity of $SO_x$, as measured by the magnitude of the decrease in pH at the exit from the scrubber.

At the pH range used in step (c) where at least part of the sulfite ions, and carbonate ions also if pH is about 8 to 11, are precipitated, no sulfate ions will precipitate. The calcium ions added in this step should not exceed an amount stoichiometrically equal to the sulfite ions present, so that the majority of the calcium ions will be precipitated as calcium sulfite. In this way the liquor being recirculated back to the step (a) scrubbing will contain only a few to several hundred PPM of calcium ions.

Thus, the bulk of the precipitation of the calcium salts is effected in step (e). The calcium sulfite, sulfate, and any carbonate salts are recovered and post-treated or handled by conventional means. Liquor from washing of the cake or sludge of calcium salts can, if desired, be added back into step (e).

If desired, in one embodiment of this invention, the mixer-settler 2 shown in the drawing for step (c) treatment may be replaced with only a mixer. Any calcium sulfite solids contained in the step (c) liquor of either embodiment which is recirculated to step (a) will not cause scaling of the scrubber. Normally, however, when a mixer-settler is used, the liquor from the upper or overflow section of the settler will contain a minimum of solids and thus is preferred for recirculation to step (a).

BRIEF DESCRIPTION OF THE DRAWING

The FIGURE is a block or flow diagram of the improved wet flue gas scrubbing system for $SO_x$ removal.

DESCRIPTION OF THE PREFERRED EMBODIMENTS

The process of this invention may best be understood by referring to the FIGURE, wherein blowers, valves, pumps and other auxiliary equipment needed to make a complete engineering drawing of the process are not shown in order to simplify the understanding of the process and because such auxiliary equipment can easily be supplied by one of ordinary skill in the art. Flue gas, for example, from a fossil fuel fired boiler, at about 300°F. containing $SO_2$, $SO_3$ and fly ash is introduced to scrubber 1 by line 10. In the scrubber, the flue gas is washed with an aqueous diethanolamine solution which may suitably contain from about 1 to about 10, and preferably about 3 to 6, weight percent diethanolamine, the solution having a pH of about 4 to 8, and preferably about 7, and buffered by bisulfite/sulfite ions. A portion of the partially spent amine solution having a pH of about 4 to 8, and preferably about 6, is recirculated by line 17 to treat flue gas in the scrubber. Another portion of the partially spent amine solution is withdrawn by line 12 to mixer-settler 2. From the bottom of the settler of mixer-settler 2, calcium sulfite precipitate, fly ash which has settled out and a portion, for example, about 20 to 80 percent, and preferably about 40 to 60 percent, of the liquor is withdrawn by line 24 and sent by lines 25 and 18 to mixer-settler 3. From the upper portion of the settler section of mixer-settler 2, the remaining liquor, preferably at a pH of about 7 to 10 is withdrawn by line 15 and goes by lines 16 and 17 to flue gas treatment in the scrubber. Alternatively, precipitate and fly ash from the bottom of mixer-settler 2 can be removed by lines 24 and 14, and a portion of the liquor can be taken by lines 15, 26 and 18 to mixer-settler 3. Calcium hydroxide is added by line 19 in sufficient quantities to mixer-settler 3 to precipitate sulfite and sulfate ion. Calcium sulfite, calcium sulfate and fly ash which have settled out in the settler portion of mixer-settler 3 are withdrawn by line 20. Overflow supernatant at a pH of about 10 to 12 from mixer-settler 3 is taken by line 21 and returned for treatment in mixer-settler 2. Alternatively, some supplemental calcium ion in the form of calcium hydroxide can be added by line 13 to mixer-settler 2. Periodically, makeup water and aqueous amine solution can be added to the system by line 22 to replace water and amine lost with the treated flue gas leaving the scrubber by line 11 or with the material withdrawn from the settlers by lines 14 and 20. pH of the spent solution leaving the scrubber can be controlled by adding a portion of the liquor by lines 16 and 23 to the bottom portion of the scrubber.

Effective scrubbing of $SO_2$ from the flue gas requires pH control of the scrubbing liquid and this control is exercised to a large degree through the buffer system involving the $HSO_3^-/SO_3^=$ ions. It appears that the optimum pH range for effective scrubbing using calcium hydroxide is about 4 to 8, and preferably about 6 to 8. Above pH 8.0, calcium carbonate begins to form and precipitate, and this would represent a loss of calcium available for $SO_x$ removal as well as formation of scale in the scrubber.

Both monoethanolamine and diethanolamine are miscible with water. The amine should be present in minor amount in the aqueous amine solution. For example, from about 1 to 10 percent, and preferably about 3 to 6 percent, by weight of amine in the aqueous scrubbing solution is a necessary range in which to operate the system. At above about 10% amine concentration in the solution, excessive carbon dioxide absorption will result, particularly at the upper end of the pH range used in the scrubber, leading to carbonate formation and precipitation of calcium carbonate in the scrubber and scaling.

Although the preferred amines to use in the process of our invention are monoethanolamine, diethanolamine or mixtures thereof, other amines are operable in the process. A list of other amines operable in the present process are: methylamine, dimethylamine, trimethylamine, ethylamine, diethylamine, ethylenediamine, cyclohexylamine, propylenediamine, trimethylenediamine, trimethylenetetraamine, hexamethylenediamine, diethylenetriamine. Other amines with $pK_a$'s in the range of 7 to 11, preferably 8 to 11, at 25°C. are operable in the process of the invention. pK is the symbol for the logarithm of the reciprocal of the dissociation constant of an electrolyte:

$$pK = \log 1/K, \text{ and } pK_a = 14\text{-}pK_b.$$

When the pH is maintained in the range of about 4 to 8 in the scrubber, preferably about 6 to 8, for example 7, in the scrubbing liquid entering the scrubber to treat the flue gas within the same pH range, but preferably slightly lower, for example, 6, in the spent liquid removed from the scrubber using diethanolamine scrubbing liquid, removal of $SO_x$ is about 90+%. Also fly ash is removed to the extent of about 99+% by mechanical contact with the scrubbing liquid. Normally it will be desirable to reheat the clean gas leaving the scrubber for buoyancy and plume control from a temperature of about 125°F. up to about 250°F. and this can be done by adding and burning natural gas in the stack to heat the clean flue gas.

In the first mixer-settler the amount of calcium ions added is no more than, and preferably only about one quarter of, the stoichiometric amount for precipitation of all the sulfite. Thus, a high concentration of sulfite remains to maintain the bisulfite/sulfite buffer and the calcium added is quantitatively precipitated as calcium sulfite. Complete removal of $SO_x$ reaction products occurs in the second mixer-settler. Calcium sulfate does not precipitate in the first mixer-settler because it is more soluble than calcium sulfite. To precipitate both sulfite and sulfate, at least the stoichiometric amount of calcium hydroxide is added in this second mixer-settler. The resulting pH must be maintained in the range of about 10 to 12 in the second mixer-settler since above about pH 12 calcium hydroxide becomes insoluble and is not available for precipitation of the sulfite and sulfate.

Reaction kinetics play an important role in this process since our studies show that calcium sulfite precipitates quantitatively in a very short time upon the addition of calcium hydroxide; whereas, calcium sulfate tends to form supersaturated solutions that precipitate slowly, requiring 10 to 15 minutes or more for the major sulfate content to precipitate. Thus, the second mixer-settler provides for a longer retention and settling time than the first mixer-settler.

The overflow supernatant from the second mixer-settler may contain calcium sulfate in solution in a state of incipient precipitation. It cannot be returned to the scrubber in this state because scale formation in the scrubber and lines would be highly probable. Therefore, overflow supernatant from the second mixer-settler returns to the first mixer-settler for retreatment. The high relative concentration of sulfite to sulfate in the first mixer-settler means that sulfite ions will compete strongly and successfully against the sulfate ions for calcium ions. Thus, the threat of incipient scale formation through latent calcium sulfate precipitation is removed in the first mixer-settler, and the sulfate is again stabilized in soluble form.

Over a period of time, solubles build up in the scrubbing liquid, e.g., chlorides, nitrates and the like entering in the flue gas, fly ash, or makeup water. Ultimately, the scrubbing liquid will have to be treated to remove "solubles". To regenerate the scrubbing liquid, caustic soda can be added to supernatant from mixer-settler 3 and the mixture evaporated. Water and amine condensate are then returned to mixer-settler 2 and the residual soluble salts are discarded.

The preferred amines, i.e., the mono- and diethanolamines recommended for use in our process have relatively low vapor pressures at the anticipated operating temperatures, and it is expected that the stack losses of amine will be negligible, especially since the amine will exist in the scrubber as the amine salt of sulfite, bisulfite or sulfate and the vapor pressures of these materials are expected to be considerably lower than those of the free amines.

Especially in mixer-settler 3, the second regeneration step, but also to a certain extent in mixer-settler 2, the liquid remaining in the filter cake constitutes another source of amine loss. The filter cake can be washed with fresh water which will return to the regeneration system and thus make up for evaporative water loss in the scrubber. However, in order to achieve a water balance throughout the entire system, it is necessary to wash the cake with just that amount of water that will compensate for total water losses elsewhere in the system, i.e., from the scrubber and in the wet filter cake.

Because sulfite tends to oxidize to sulfate in aqueous solutions, it is desirable to inhibit the rate of oxidation to maintain both the buffer capacity of the scrubbing liquid and the calcium ion scavenging capacity. The former, i.e., the buffer capacity, is needed for efficient removal of $SO_x$ from flue gas, while the latter is important to inhibit scaling in the scrubber system. The amine absorbent has oxidation inhibiting properties and it is expected the amine will tend to inhibit oxidation. It may also be desirable to add other supplementary oxidation inhibitors.

If desired, a dust and fly ash removal system can be used ahead of the scrubber to remove the great bulk of dust and fly ash from the system and keep it out of the scrubber and associated amine regeneration system. Conventional means such as electrostatic precipitation, cyclone means and the like can be used ahead of the scrubber for this dust and fly ash removal.

Also, if desired, a demister can be used to treat the clean flue gas leaving the scrubber, and the flue gas can be reheated to about 250°F. for buoyancy.

WORKING EXAMPLE

The following working example is exemplary of the practice of this invention after steady state continuous operation has been achieved following start up. The values shown for the several process variables are typical mean values during the period of operation and are not intended to provide a material balance.

A pilot unit embodying the process of this invention is operated over a 7 day period to treat a slipstream from the flue gases generated by a coal fired boiler. This slipstream (hereinafter called "flue gas") has a flow rate of about 2,400 standard cubic feet per minute (SCFM) and contains about 1,500 to 2,400 ppm of $SO_2$, about 300 to 450 ppm of $NO_x$, about 13.2 volume percent of $CO_2$, and about 0.5 to 1.5 grains of fly ash per standard cubic foot (SCF); the exact loadings of these impurities varying within said ranges during the 7 day period.

Fly ash, but not $SO_2$ or $NO_x$, is removed from this flue gas in a conventional Ventri Rod Scrubber such that the exiting flue gas is at about 123°F. and contains about 0.02 to 0.05 grains of fly ash per SCF.

The flue gas is then immediately fed into a Ceilcote Cross Flow Absorber (herein referred to as a scrubber) where it is scrubbed with a 5.0 weight percent aqueous solution of diethanolamine obtained essentially from recycle streams as shown below. Due to amine losses in the filter cake, it is necessary to add about 0.8 gallons of a 70% aqueous diethanolamine solution onces each 24 hours. Otherwise, the process operates continuously on the regenerated amine. This scrubber is packed with 1 inch Tellerette packing and is operated according to the following specifications:

| | | |
|---|---|---|
| Design of Scrubber | | |
| G = Gas Flow | = | 17.55.6 lbs/hr/sq. ft. |
| L = Liquid Flow | = | 2490 lbs/hr/sq. ft. |
| L/G Ratio | = | 1.418 |
| Amine Solution Flow Rate into Scrubber | | |
| Fresh amine solution (70% concentration) | | 0.8 gal/day |
| Circulating spent amine solution | | 50 gal/min |
| Recirculated Liquor (from mixer-settler 2) | | 8.7 gal/min |
| Total amine solution into Scrubber | | 58.7 gal/min |
| pH entering Scrubber | | 6.0 |
| Amine concentration in total amine solution | | 5.0% by weight |
| Inlet Flue Gas - | Temperature | 123°F. |
| | Pressure | 18-20 inches of water vacuum |
| | Flow Rate | 2400 SCFM |
| | $SO_2$ | 1500-2400 ppm |
| | $NO_x$ | 300-450 ppm |
| | $CO_2$ | 13.2 Volume % |
| | Fly Ash | 0.02-0.05 gr/SCF |
| Outlet Flue Gas - | Temperature | 120°F. |
| | Pressure | 24 inches water vacuum |
| | $SO_2$ | 20-150 ppm |
| | $NO_x$ | 300-450 ppm |
| | $CO_2$ | 13.2 Volume % |
| | Fly Ash | 0.004 gr/SCF |
| Circulating Spent Amine Solution: | | |
| | Flow | 50 gal/min |
| | Temperature | 120°F. |
| | Pressure | 35 psig |
| | pH | 5.8–6.0 |
| Composition of Spent Amine Solution | | |
| Total Suspended Solids (essentially all Fly Ash) | | 15.59 gms/liter |
| Dissolved $Ca^{++}$ | | 35 mgm/liter |
| Dissolved $SO_4^=$ | | 18.54 gms/liter |
| Dissolved $SO_3^=/HSO_3^-$ | | 12.19 gms/liter |
| Dissolved $CO_3^=$ | | Negligible |

The outlet flue gas is vented to the atmosphere. The 8.7 gal/min portion of the spent amine solution which is not being recirculated is fed into mixer-settler 2 where it is mixed with the overflow supernatant from mixer-settler 3 (see below for composition of this stream) according to the following specifications:

| | |
|---|---|
| Mixer-Settler 2 Operating Conditions | |
| Temperature | 111°F. |
| pH | 7.0–8.0 |
| Spent Amine Solution | 8.7 gal/min |
| Overflow Supernatant (from mixer-settler 3) | 8.0 gal/min |
| Total Volume | 5,883 gallons |
| Residence Time | 6.7 hours |
| Recirculated (to Scrubber) Liquor From Overflow Weir of Settler 2: | |
| Flow Rate | 8.7 gal/min |
| Dissolved $Ca^{++}$ | 24 mgm/liter |
| Dissolved $SO_4^=$ | 17.74 gms/liter |
| Dissolved $SO_3^=$ | 1.02 gms/liter |
| Dissolved $CO_3^=$ | Negligible |
| Total Suspended Solids (essentially all fly ash) | 0.53 gms/liter |
| Underflow (to Mixer-Settler 3) Liquor from Settler 2: | |
| Flow Rate | 6 gal/min |
| Dissolved Ions | Same as Recirculated Liquor |
| Total Suspended Solids ($CaSO_3$ + Fly Ash) | 13.48 gms/liter |

The recirculated liquor stream is continuously recycled back to the scrubber; it is this stream which contains the regenerated diethanolamine. The underflow liquor stream containing slurried $CaSO_3$ solids is fed into mixer-settler 3 and mixed with slaked lime according to the following specifications:

| | |
|---|---|
| Mixer-Settler 3 Operating Conditions | |
| Temperature | 112 to 117°F. |
| pH | 11.0 to 12.0 |
| Total Volume | 5,702 gallons |
| Residence Time | 13.6 hours |
| Slaked Lime Addition Rate | 0.8 lbs/min - as $Ca(OH)_2$ |
| Liquor Charge Rate | 6 gal/min |
| Overflow Supernatant Stream-recycled to Mixer-Settler 2 | |
| Flow Rate | 8 gal/min |
| Total Suspended Solids | 0 to 370 mgm/liter |
| Dissolved $Ca^{++}$ | 2000 mgm/liter |
| Dissolved $SO_4^=$ | 2000 mgm/liter |
| Dissolved $SO_3^=$ | 0 to 200 mgm/liter |
| Underflow Slurry - to sludge cake filter | |
| Flow Rate | 0.5 gal/min |
| Solids ($CaSO_4/CaSO_3$ + Fly Ash) | 28.6 to 41.8% of slurry |
| Dissolved Ions | Same as Overflow Supernatant |

The overflow supernatant is recycled back to mixer-settler 2 where it is mixed with the spent amine solution. The underflow slurry is fed onto a horizontal belt filter where solids are filtered and washed with a controlled quantity of water according to the following specifications:

| | |
|---|---|
| Cake Rate ($CaSO_4/CaSO_3$ Solids) | 3.4 lbs/min |
| Wash Water Rate | 0.94 gal/min |
| Moisture of Cake | 48% |

The liquor and wash water obtained from this filtering operation are recycled back to mixer-settler 3.

There is no trace of scaling in the Ceilcote Cross Flow Absorber (scrubber) after this 7 day run. In fact, after 44 days of operation with only a few brief shutdowns, there is no evidence of scaling in the absorber (scrubber).

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Ac-

What is claimed is:

1. A process of $SO_x$ removal from flue gas comprising:

Step a. of treating said flue gas with an aqueous solution consisting essentially of about 1 to 10 weight percent of an amine having a $pK_a$ of about 7 to 11, the aqueous phase having a pH of about 4 to 8 entering this step (a);

Step b. of withdrawing a portion of at least partially spent solution from step (a) and recirculating said portion to step (a) flue gas treatment;

Step c. of withdrawing at least a portion of the remaining at least partially spent solution from step (a) and treating the same with calcium ions in a proportion which is stoichiometrically not greater than the sulfite ion content thereof to precipitate calcium sulfite;

Step d. of withdrawing a portion of liquor from step (c) and recirculating said portion to step (a) flue gas treatment;

Step e. of withdrawing all or another portion of the remaining liquor from step (c) together with from none to all of the calcium sulfite solids from step (c) and treating the sulfate ions and any remaining sulfite ions contained therein with at least a stoichiometrically equivalent proportion of calcium hydroxide to precipitate the calcium salts thereof; and Step f. separating the solid calcium salts formed in step (e) from at least a major proportion of the aqueous phase resulting from step (e) and recirculating said separated aqueous phase and the calcium ions contained therein to step (c).

2. A process as in claim 1 wherein substantially all of the calcium ions used in step (c) are supplied by the aqueous phase from step (f).

3. A process as in claim 1 wherein calcium hydroxide is added in step (c) to supplement the calcium ions supplied to step (c) by the aqueous phase from step (f).

4. A process as in claim 1 wherein the amine comprises a monoethanolamine, diethanolamine or mixtures thereof.

5. A process as in claim 4 wherein sufficient calcium hydroxide is added in step (e) such that the pH of the supernatant from step (c) is about 5.5 to 11.

6. A process as in claim 4 wherein the calcium sulfite solids precipitated in step (c) are separated from the liquor so that the liquor going to step (e) contains substantially no calcium sulfite solids.

7. A process as in claim 4 wherein substantially all of the calcium sulfite solids precipitated in step (c) are added to step (e).

8. A process as in claim 7 wherein the amine is diethanolamine.

9. A process as in claim 1 wherein the calcium salts are precipitated in step (e) at a pH of about 10 to 12.

* * * * *